United States Patent [19]
Costa

[11] Patent Number: 5,120,486
[45] Date of Patent: Jun. 9, 1992

[54] METHOD OF MOLDING A BOBBIN FOR A BALLAST

[75] Inventor: Larry J. Costa, Danville, Ill.

[73] Assignee: Valmont Industries, Inc., Valley, Nebr.

[21] Appl. No.: 315,810

[22] Filed: Feb. 27, 1989

[51] Int. Cl.⁵ .............................................. B29C 45/26
[52] U.S. Cl. ............................ 264/328.8; 264/328.12
[58] Field of Search ............ 264/328.1, 328.8, 328.12; 425/573, 577

[56] References Cited

U.S. PATENT DOCUMENTS

| | | | |
|---|---|---|---|
| 2,799,435 | 7/1957 | Abplanalp | 264/328.8 |
| 3,421,730 | 1/1969 | Woods et al. | 425/577 |
| 3,995,008 | 11/1976 | Spiegelberg | 264/328.8 |
| 4,382,522 | 5/1983 | Shimazu et al. | 264/328.9 |
| 4,450,132 | 5/1984 | Ettema et al. | 264/328.8 |
| 4,743,420 | 5/1988 | Dutt | 264/328.12 |

*Primary Examiner*—Jill L. Heitbrink
*Attorney, Agent, or Firm*—Zarley, McKee, Thomte, Voorhees & Sease

[57] ABSTRACT

A method for molding a plastic bobbin is described comprising the steps of injecting a fluid plastic material into the opposite ends of an elongated cavity formed in the mold with the elongated cavity serving as an internal molding runner during the injection process and which forms a lamination compression ridge in the finished product.

2 Claims, 2 Drawing Sheets

METHOD OF MOLDING A BOBBIN FOR A BALLAST

BACKGROUND OF THE INVENTION

Plastic bobbins are utilized in ballasts for fluorescent lights and the like. One form of such a ballast is disclosed in U.S. patent application Ser. No. 257,528, filed Oct. 14, 1988, entitled "An Improved Ballast", the disclosure of which is incorporated herein by reference. The ballast of the co-pending application is formed of plastic and is molded through the use of one or more die parts having suitable cavities formed therein so that a bobbin is created which includes an elongated rectangular body member having a plurality of flanges and stand-offs extending radially outwardly therefrom. At least some of the flanges are provided with small notches or the like which are adapted to receive the wires of the coil windings positioned on the rectangular body portion. The body portion is also provided with an elongated opening extending therethrough which is adapted to receive the central portion of a laminated core. In many bobbins, an elongated lamination compression ridge protrudes from the body portion into the central opening which is designed to exert pressure on the laminations of the central portion of the core to prevent vibration thereof. Since the central portion of the core is comprised of a plurality of laminations, the thickness of the same can vary from one core to another due to the permissible tolerances of the laminations. In those cases where the central portion of the core is slightly larger than the average, a portion of the compression ridge will be sheared when the core is inserted into the central opening of the bobbin. In those cases where the thickness of the central portion of the core is slightly less than the average, the lamination compression ridge will still exert pressure on the core to prevent vibration thereof.

During the molding of the plastic bobbin, the plastic material is normally injected through one or more sprue gates or injection openings provided at the opposite ends of the bobbin. Inasmuch as the parts of the bobbin are extremely small or thin at the core section of the bobbin and are located farthest away from the points of injection, high injection pressure must be utilized to ensure that the plastic material will be supplied to the internal cavities of the die parts. The fact that such high injection pressure is utilized where the bobbin parts are thicker with complex bobbin details results in objectionable "flashing" being created in the bobbin which must be subsequently trimmed or removed so as not to interfere with the fabrication of the ballast.

It is therefore a principal object of the invention to provide a method of molding a bobbin for a ballast.

A further object of the invention is to provide a method of molding a plastic bobbin for a ballast wherein the fluid plastic material is injected into opposite ends of the cavity for forming the lamination compression ridge so that the said cavity acts as an internal runner or passage for the fluid plastic material.

Still another object of the invention is to provide a method of molding a plastic bobbin which facilitates a higher material flow speed in the thin cross-section thereof that propagates to the vented thick section of the bobbin thereby reducing injection pressure.

A further object of the invention is to provide a method of molding a bobbin for ballast or the like which permits simplification of the mold design and improves the operational performance of the mold.

These and other objects will be apparent to those skilled in the art.

SUMMARY OF THE INVENTION

In the instant invention, fluid plastic material is injected into a bobbin mold in such a manner so that the plastic material enters the mold at the opposite ends of the cavity which forms the lamination compression ridge of the bobbin. The location of the injection openings or sprue gates facilitates a higher material flow speed in the thin cross-section which propagates to the vented thick section of the bobbin thereby reducing injection pressure. The instant invention permits the mold design to be simplified. Further, the fact that the fluid material is injected into the ends of the lamination compression ridge aids in reducing flashing normally associated with the thicker portions of the bobbin with complex details.

DESCRIPTION OF THE PREFERRED EMBODIMENT

Figure 1:
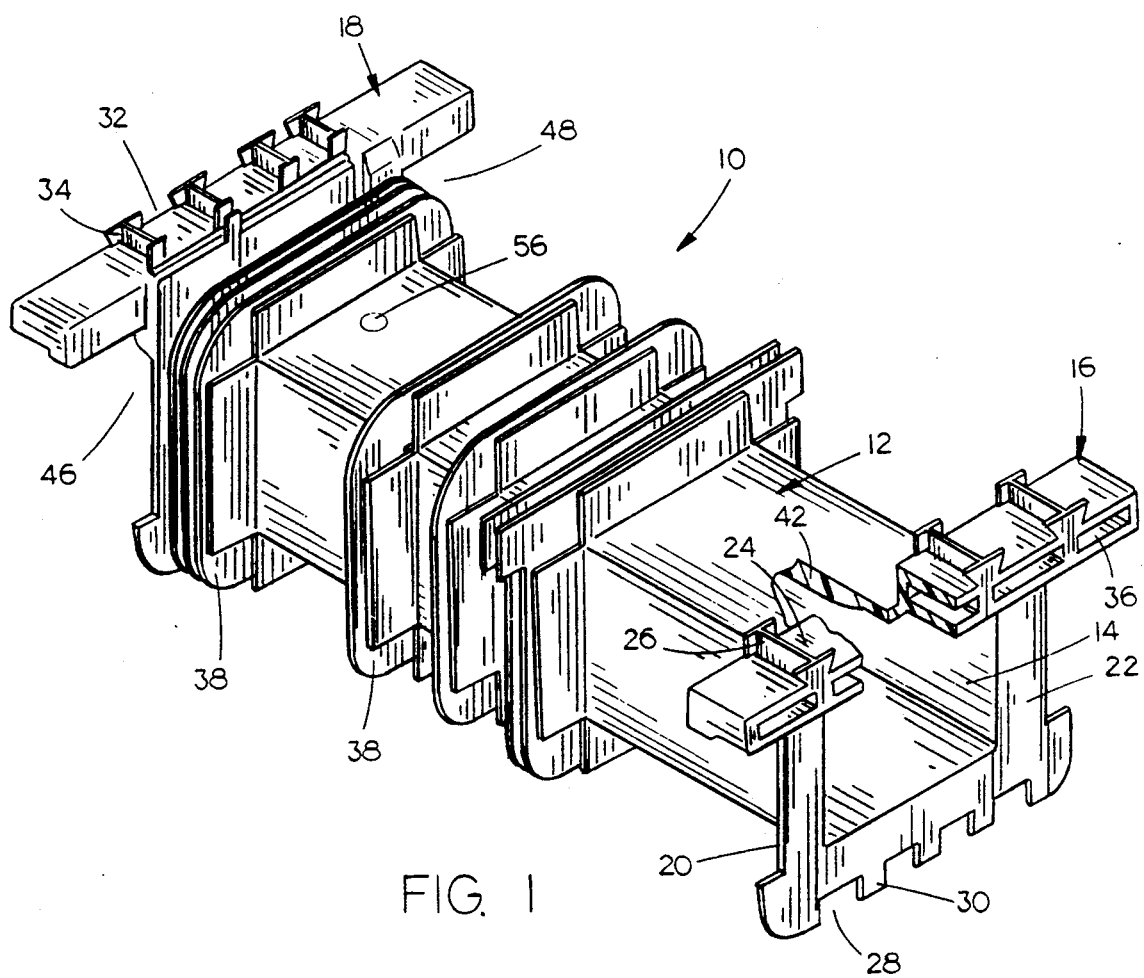
FIG. 1 is a perspective view of a ballast bobbin molded by the method of this invention.
Figure 2:
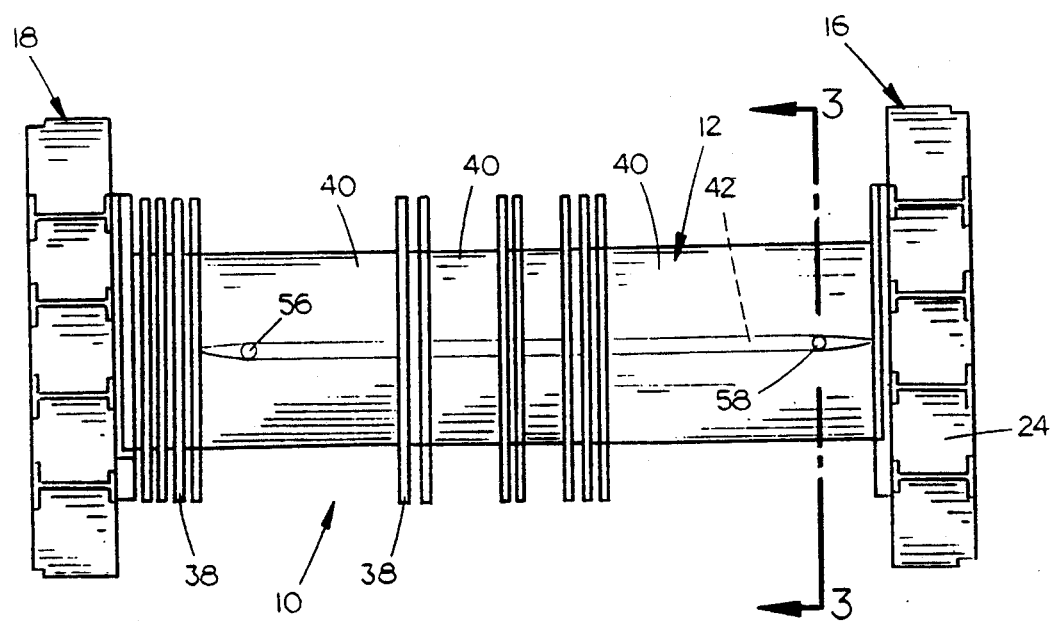
FIG. 2 is a top view of the bobbin of FIG. 1.
Figure 3:
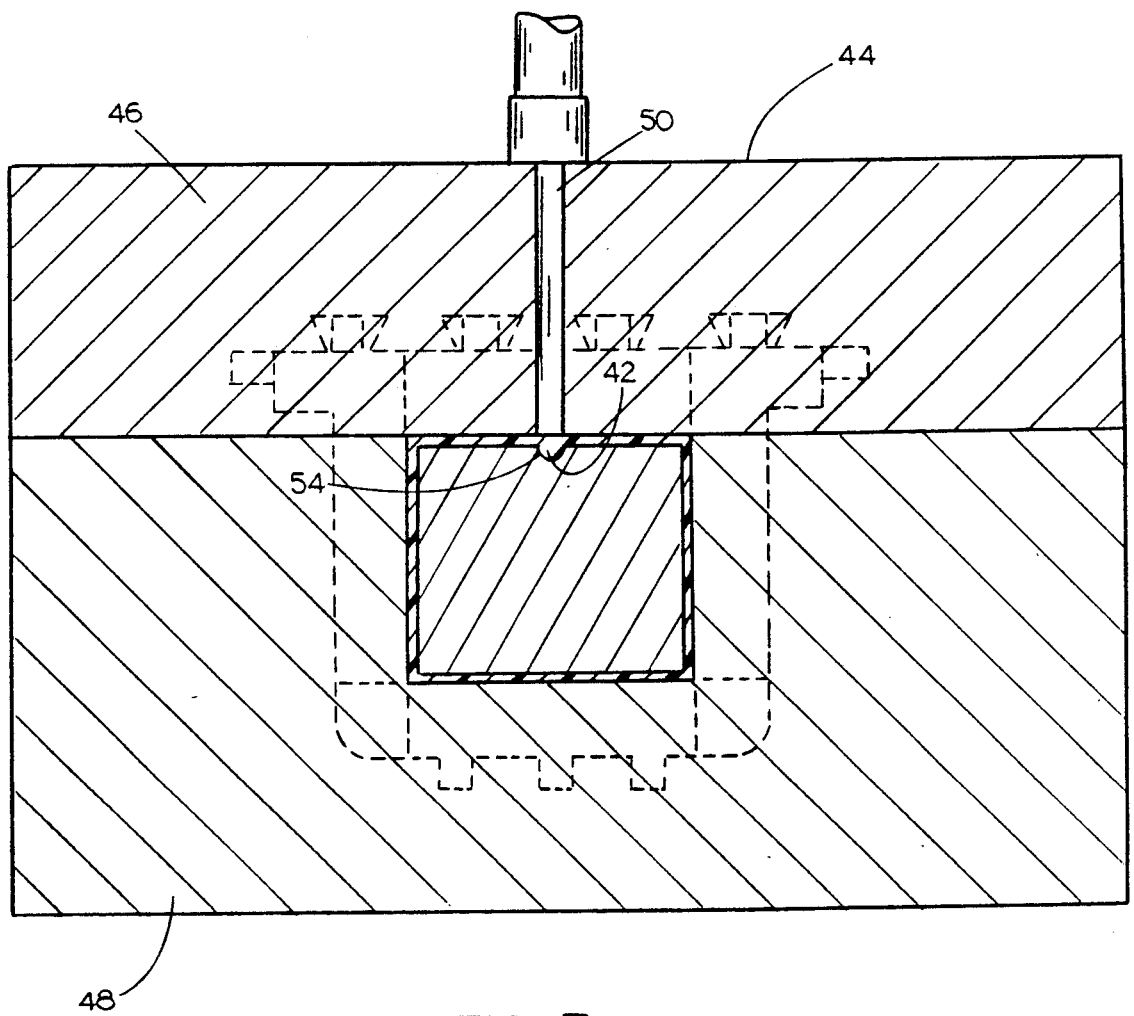
FIG. 3 is a sectional view of the bobbin of FIG. 2 positioned in a mold.

Referring to the drawings, the numeral 10 refers the bobbin produced by the method of this invention. The bobbin 10 is ideally suited for use in the ballast described in the pending application, Ser. No. 257,528 filed Oct. 4, 1988. Bobbin 10 is comprised of a thermoplastic material and is provided with a substantially square body portion 12 having a central opening 14 extending therethrough. Body 12 is also provided with upstanding end portions 16 and 18 at the opposite ends thereof as seen in FIG. 1. End portion 16 is provided with notches 20 and 22 extending into the sides thereof adapted to receive portions of the associated core. The upper edge of end portion 16 (as viewed in FIG. 1) is provided with a plurality of spaced-apart notches 30 separated by tabs 26. As seen in the drawings, the lower edge of end portion 16 is also provided with a plurality of spaced-apart notches 28 separated by tabs 30 which serve as conductor tab anchoring mechanisms.

End portion 18 is provided with notches 46 and 48 extending into the sides thereof adapted to receive portions of the associated core. The upper edge of end portion 18 is provided with a plurality of notches 32 separated by tabs 34. The lower end of end portion 18 is provided with a plurality of notches separated by a plurality of tabs similar to that at the lower end of end portion 16.

The drawings illustrate that the bobbin 10 is provided with a plurality of terminal supports 36 extending therefrom although the terminal supports may take any desired shape for the purpose of this invention. Bobbin 10 is also provided with a plurality of radially extending flanges 38 extending from body portion 12 as seen in the drawings. The various flanges 38 are positioned to provide coil winding compartments, shunt compartments, etc. For purposes of this description, the various flanges, etc. define a plurality winding sections 40. Bobbin 10 is provided with an elongated lamination compression ridge 42 which protrudes into the central opening 14 as seen in the drawings. As previously described, the compression ridge 42 is designed to exert pressure on the core laminations to prevent vibration of the same. If the core being inserted into the central opening 14 is slightly thicker than average, the laminations simply shear or remove a portion of the ridge 42 during the insertion thereof. It the core being inserted into the central opening 14 is slightly thinner than average, the ridge 42 will still engage the same to prevent vibration thereof.

The numeral 44 refers generally to the mold which is utilized to form the bobbin of this invention. Mold 44 would normally be comprised of at least two (and possibly more) mold parts 46 and 48 having cavities formed therein to form the various portions of the bobbin during the molding operation. Mold 44 is provided with a pair of spaced-apart sprue gates or injection openings 50 and 52 (not shown) which communicate with opposite ends of the cavity 54 in the mold 44. Cavity 54 forms the lamination compression ridge 42. Thus, during the injection of the plastic material into the mold 44, the plastic material may be injected into the mold with less injection pressure than normally required thereby simplifying the mold design and improving the operational performance of the mold. Since the sprue gates 50 and 52 communicate with the die cavities at the location described, sufficient material thickness is present to permit dimples 56 and 58 being provided in the winding compartments at the sprue gate locations. Such facilitates a recess for the sprue to separate without protruding into the winding compartment where it could damage the wire insulation.

Thus, the cavity for the lamination compression ridge serves as an internal passage or runner for the plastic material so that the plastic material will be supplied to the small or thin cavity portions such as the location of the various stand-offs, notches, tabs, etc. thereby reducing the occurrence of flashing.

The method of this invention permits lower injection pressure to be utilized thereby eliminating the objectionable "flashing" being created in the bobbin which would have to be subsequently trimmed or removed so as not to interfere with the fabrication of the ballast.

I claim:

1. The method of molding a plastic bobbin for use in a ballast, comprising, providing a molding die including one or more die parts having cavities formed therein, into which a fluid plastic material may be injected to form a bobbin having an elongated rectangular body portion with opposite ends, a top wall having inner and outer surfaces, a bottom wall having inner and outer surfaces, opposite side walls having inner and outer surfaces, said walls defining a central opening extending through said body portion, and an elongated lamination compression ridge protruding from the inner surface of one of said walls into said central opening, and a plurality of spaced-apart flanges extending radially outwardly from said body portion, creating one or more sprue gates in at least some of said die parts so that the inner ends thereof communicate with the die cavity for forming the lamination compression ridge, and injecting fluid plastic material through said sprue gates into the cavity for forming the lamination compression ridge so that the said cavity serves as an internal molding runner during the injection process and so that a recessed dimple will be formed in the outer surface of the said one wall, at the discharge end of the sprue gate when the bobbin is removed from the die.

2. The method of claim 1 wherein at least one sprue gate is formed in the die parts adjacent one of the opposite ends of the cavity for forming the lamination compression ridge.

* * * * *